US012677913B1

(12) United States Patent
Enshaie et al.

(10) Patent No.: US 12,677,913 B1
(45) Date of Patent: Jul. 14, 2026

(54) METHOD OF MAKING FOOTWEAR USING MOLDS

(71) Applicant: Heartland Footwear, Inc., South Bend, IN (US)

(72) Inventors: Afshin Enshaie, South Bend, IN (US); Omar Rojas, South Bend, IN (US)

(73) Assignee: Heartland Footwear, Inc., South Bend, IN (US)

( * ) Notice: Subject to any disclaimer, the term of this patent is extended or adjusted under 35 U.S.C. 154(b) by 99 days.

(21) Appl. No.: 18/623,426

(22) Filed: Apr. 1, 2024

(51) Int. Cl.
| | |
|---|---|
| *B29C 45/14* | (2006.01) |
| *A43D 86/00* | (2006.01) |
| *B29C 45/26* | (2006.01) |
| *B29C 45/00* | (2006.01) |
| *B29K 9/06* | (2006.01) |
| *B29K 105/08* | (2006.01) |
| *B29K 105/24* | (2006.01) |
| *B29K 705/12* | (2006.01) |
| *B29L 31/50* | (2006.01) |

(52) U.S. Cl.
CPC ........ *A43D 86/00* (2013.01); *B29C 45/14008* (2013.01); *B29C 45/26* (2013.01); *B29C 45/0005* (2013.01); *B29K 2009/06* (2013.01); *B29K 2105/0845* (2013.01); *B29K 2105/0854*
(2013.01); *B29K 2105/24* (2013.01); *B29K 2705/12* (2013.01); *B29L 2031/504* (2013.01)

(58) Field of Classification Search
CPC ... B29D 35/122; B29D 35/126; B29D 35/128
See application file for complete search history.

(56) References Cited

U.S. PATENT DOCUMENTS

| | | | | |
|---|---|---|---|---|
| 8,641,953 | B2 | 2/2014 | Cook et al. | |
| 9,421,726 | B2 * | 8/2016 | Scofield | B29D 35/128 |
| 11,083,242 | B2 * | 8/2021 | Bongers | B29D 35/04 |
| 2004/0020077 | A1 * | 2/2004 | Thomas | A43B 7/12 |
| | | | | 12/142 E |
| 2013/0133229 | A1 * | 5/2013 | Ludemann | B29D 35/04 |
| | | | | 12/146 B |

FOREIGN PATENT DOCUMENTS

| | | | |
|---|---|---|---|
| CA | 2854683 | * | 12/2015 |
| FR | 2468323 | A1 | 5/1981 |
| JP | 2000270902 | * | 10/2000 |
| KR | 100964332 | B1 | 6/2010 |

* cited by examiner

*Primary Examiner* — Edmund H Lee
(74) *Attorney, Agent, or Firm* — Hinshaw & Culbertson LLP; Roger M. Masson, Esq.

(57) ABSTRACT

Injection molded footwear having a flared sole is made using an injection molding method with two different molds. Both molds share the same shell and the same last, but have different plates. The first mold has a void for an upper and the second mold has a void for the flared sole in the shell.

8 Claims, 6 Drawing Sheets

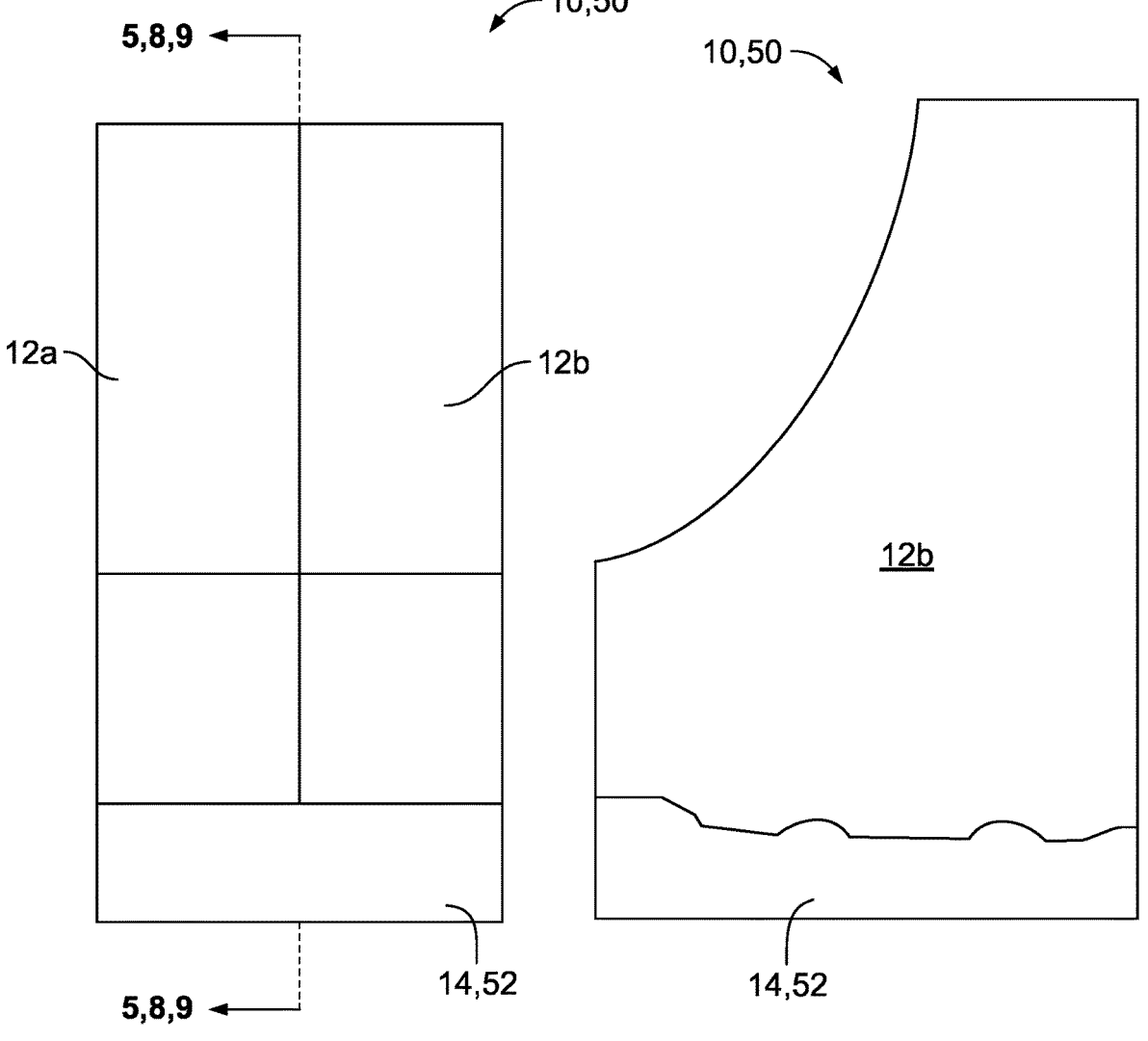
FIG. 1          FIG. 2

METHOD OF MAKING FOOTWEAR USING MOLDS

FIELD OF THE INVENTION

The field of invention is the making of footwear, particularly boots by injection molding and molds for making footwear.

BACKGROUND

Rubber footwear is often used in wet environments to keep a wearer's feet dry. Wet environments are often slippery leading to falls. It is known that footwear having a flared heel is less likely to slip, but flared soles are not possible with conventional injection molding technology. A need therefore exists for a process to make injection molded footwear having a flared sole or heel.

SUMMARY OF THE INVENTION

In a first aspect of the invention, a method of making footwear having an upper and a sole by injection molding is provided. In a first embodiment, the method includes closing a first mold and injection molding the upper of the footwear in the first mold. The first mold has a shell, a first plate and a last. Next, a second mold having the shell containing the upper, a second plate and the last is closed and a midsole of the sole is injection molded in the shell of the second mold.

Preferably, the method also includes covering the last with a sock liner of the footwear before injection molding the upper, opening the second mold, and removing the footwear from the second mold. Preferably, the method also includes inserting an insole into the second plate before injection molding the midsole.

Preferably, the method includes inserting a steel toe into the first mold.

Preferably, injection molding the midsole involves injection molding the midsole onto an outsole of the sole in the second plate.

Preferably, injection molding the midsole involves injection molding the midsole onto the upper. The molded midsole extends rearward by at least 0.1 inches of where the upper and the midsole are in contact.

Preferably, the first plate extends into the shell to provide a lower boundary to the upper.

Preferably, injection molding the midsole involves pushing air with midsole material out of the second mold through a passage in the shell. More preferably, the first plate extends into the shell to provide a lower boundary to the upper and covers the passage.

In a second embodiment of the method, the method includes closing a first mold and injection molding the upper in the first mold. The first mold has a shell, a first plate and a last. The method includes closing a second mold having the shell, a second plate and the last; and injection molding at least a portion of the sole in the shell in the second mold. The portion of the sole flares outwardly of where the upper and the portion of the sole are in contact.

Preferably, the method includes (1) covering the last with a sock liner of the footwear before injection molding the upper, (2) opening the second mold, and (3) removing the footwear from the second mold. Preferably, the method includes inserting an insole into the molded footwear.

Preferably, the method includes inserting a steel toe into the first mold.

Preferably, in the method, injection molding at least a portion of the sole involves injection molding at least a portion of the sole onto the upper.

Preferably, in the method, the first plate extends into the shell to provide a lower boundary to the upper.

Preferably, in the method, injection molding at least a portion of the sole involves pushing air with midsole material out of the mold through a passage in the shell. Preferably, the first plate extends into the shell to provide a lower boundary to the upper and covers the passage when the first mold is closed.

In another embodiment of the invention, a set of molds for making footwear having an upper and a sole by injection molding is provided. The set of molds includes a first mold and a second mold. The set could include more than two molds. The first mold has a shell, a first plate and a last. The first mold when in a closed position for molding defines a first void for injection molding of the upper. The second mold has the shell, a second plate and the last. The second mold when in a closed position for molding defines a second void in the shell for injection molding of at least a portion of the sole.

Preferably, the first plate extends into the shell to provide a lower boundary to the upper. Preferably, the second void flares outwardly in a portion of the shell from the lower boundary.

Preferably, the set of molds include in the shell a passage for releasing air from the second void during injection molding. The passage is covered by the first plate when the first mold is in the closed position.

Preferably, the shell has two halves.

Preferably, the second plate defines an outsole having large, angular, spaced lugs for evacuating debris from the outsole.

BRIEF DESCRIPTION OF THE DRAWINGS

FIG. 1 is a front elevation view of molds for making footwear in a closed position.

FIG. 2 is a side elevation view of the molds of FIG. 1

DETAILED DESCRIPTION OF THE INVENTION

Figures 3, 4:
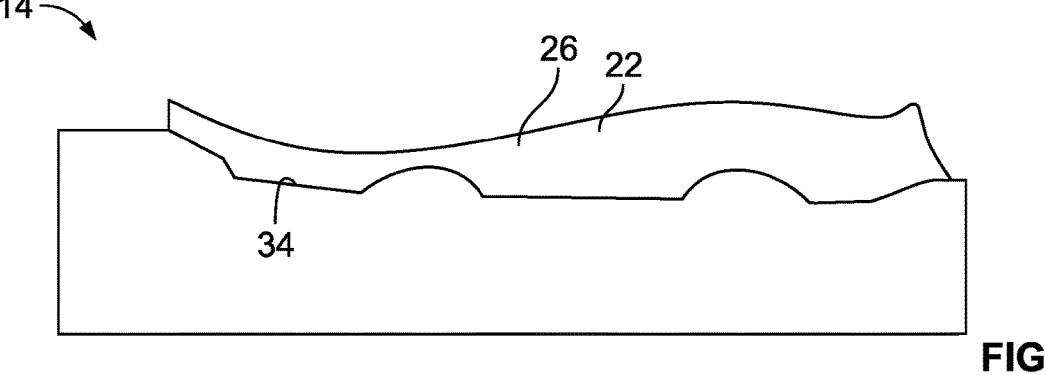
FIG. 3 is a schematic front elevation view of a first mold of the footwear molds of FIG. 1 in an open position, the first mold being for molding an upper of the footwear.
FIG. 4 is a side elevation view of a plate which is part of the footwear mold of FIG. 3.

For ease of understanding and convenience, the drawings are oriented in alignment with an upright boot. When directional terms are used herein they are used with reference to an upright item of footwear unless otherwise stated. Also, for ease of understanding, machinery to perform injection molding using the molds have been omitted from the drawings. One of skill in the art would understand that the molds may be oriented in any suitable direction during the making of the upright boot and would be able to select conventional machinery for the molding and that the molds may be partly combined in order to make a pair of footwear simultaneously.

In one aspect of the invention, molds 10 and 50 for molding footwear is provided. FIGS. 1 and 2 illustrate mold 10 and mold 50 in a closed position for injection molding of an item of footwear, specifically boot 100. Boot 100, shown in FIG. 9, may be colloquially referred to as a "rubber boot," meaning it is made primarily from plastics, particularly elastomers including natural rubber. As will be discussed later, mold 10 and mold 50 are similar externally, but different internally.

With reference to FIGS. 1-5A, mold 10 has a shell 12, a plate 14 and a last 16. Shell 12, as illustrated, has two shell halves 12a and 12b, but it is possible for shell 12 to be composed of more than 2 shell portions. Last 16 is used in injection molding to define the interior of boot 100 to be made so that a foot can be inserted into the interior of boot 100. Shell 12 and plate 14 surround last 16 or at least those portions of last 16 which support boot 100 during molding. Last 16 includes one or more compressed air passages 18 which assist with the removal of boot 100 from last 16 at the end of the molding of the boot. One of skill in the art would know how to select the number and location of passages 18. An exemplary passage 18 is shown schematically in FIG. 5A.

FIG. 3 illustrates mold 10 in an open position. The open position is used for putting a sock liner 102 of boot 100 over last 16. Sock liner 102 is typically very thin relative to mold 10 so it is omitted from the drawings except in FIGS. 5 and 5A.

As can be seen in FIGS. 3 and 4, plate 14 has a raised portion 22, which is located within mold 10 in the closed position, above a top surface 34 for mating with a bottom surface 36 of shell 12. Raised portion 22 is used during injection molding to define a lower boundary 105 to an upper 104 of boot 100 (shown in FIG. 7). It also partly defines a portion of a sole 106 of boot 100 as will be discussed. Raised portion 22 preferably has a wall 26 around the last.

Figures 5, 5A:
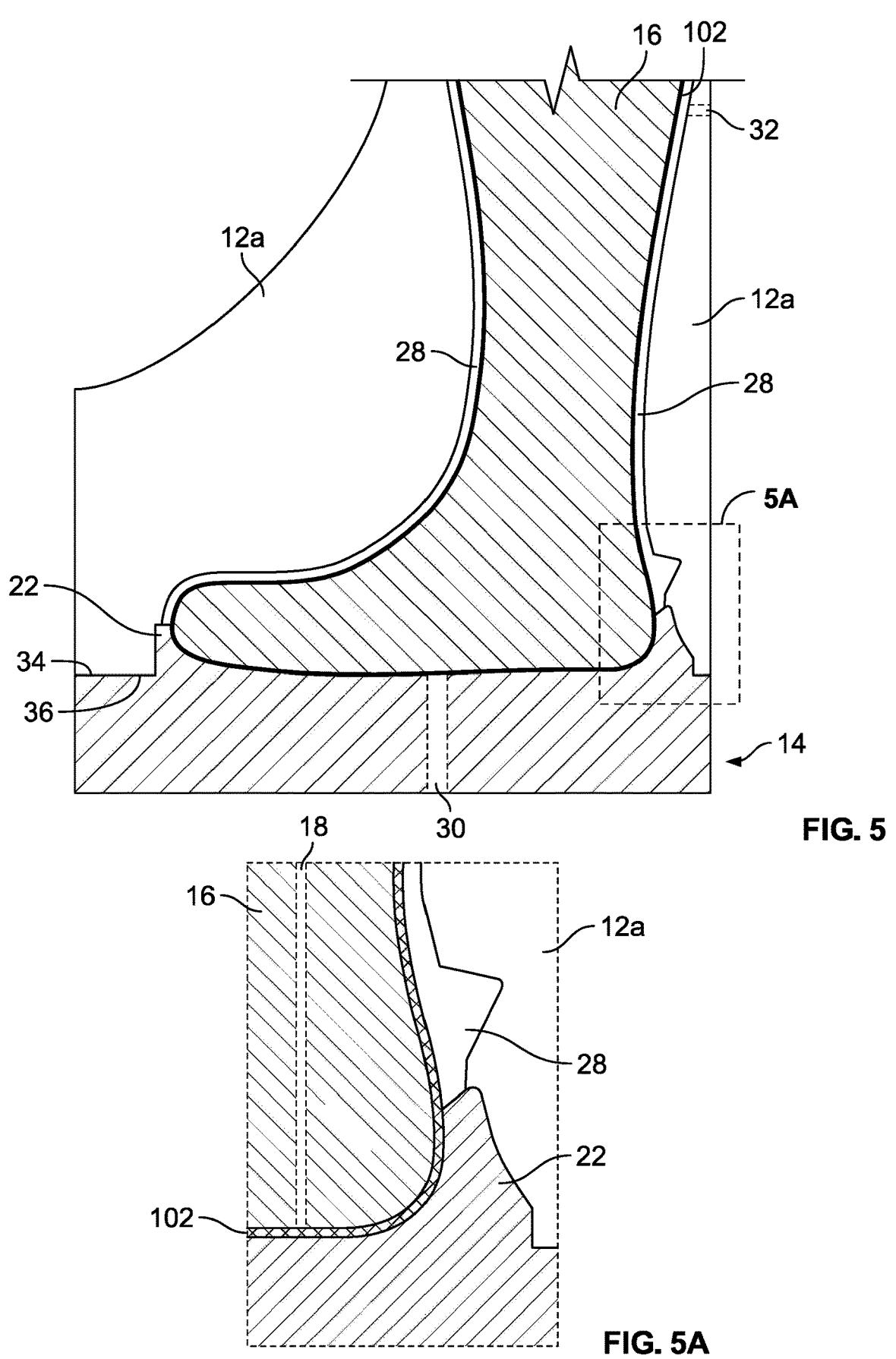
FIG. 5 is a cross-sectional view of the mold of FIG. 3 in the closed position.
FIG. 5A is a magnified view of a portion of FIG. 5.

Turning now to FIGS. 5 and 5A, sock liner 102 has been pulled over last 16 and after mold 10 is closed. For clarity, sock liner 102 is omitted from FIGS. 8 and 9 because it is very thin, but is shown in FIGS. 5 and 5A. The cross-sectional views of FIGS. 5 and 5A (and 8) are taken along an axis shown in FIG. 2 that passes between shell halves 12a and 12b, which is why only shell half 12a is shown in FIGS. 5 and 5A. Mold 10 defines a first void 28 for upper 104 within shell 12. First void 28 surrounds an upper portion of last 16. Mold 10 has at least one first void sprue 30 and at least one first void air passage 32 (shown schematically) connected to first void 28 for injection molding of upper 104 and optionally a portion of the sole. As shown schematically, sprue 30 is located under a bottom portion 40 of last 16. Sprue 30 connects to passages (not shown) in bottom portion 40 or between plate 14 and last 16. One of skill in the art would know how to select the number and locations of air passages 32. As shown, in FIGS. 3-5A, plate 14 has a cavity 38 in raised portion 22 matching a profile of the bottom portion 40. Conventional aspects of injection molds not vital to the understanding of the invention have been omitted for FIGS. 5, 5A and 8.

Figure 6:
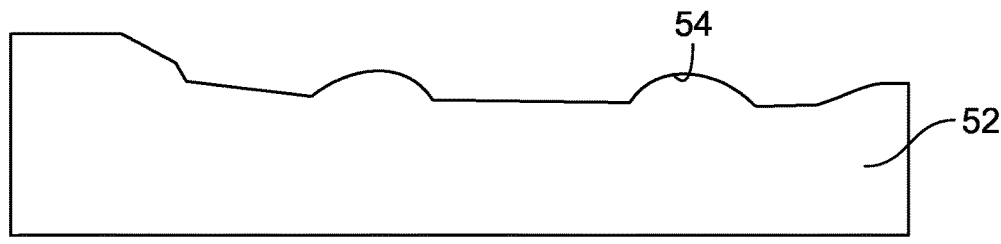
FIG. 6 is a side elevation view of a plate of a second mold of the footwear molds of FIG. 1.
Figure 7:
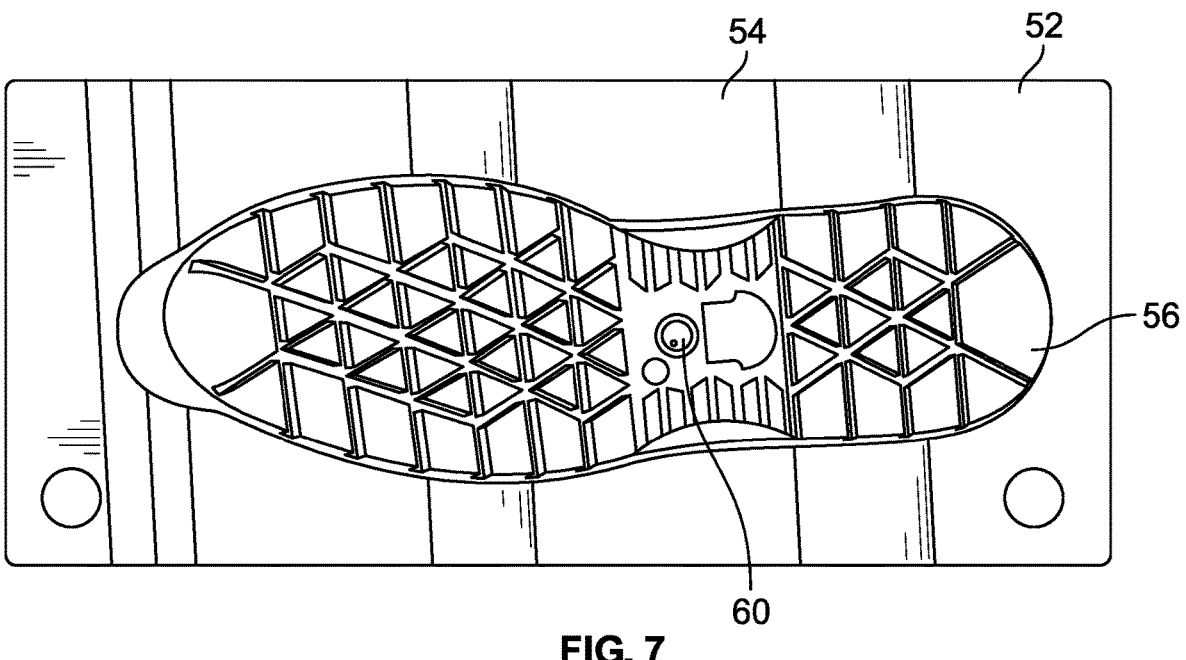
FIG. 7 is a top plan view of the plate of FIG. 6.
Figure 8:
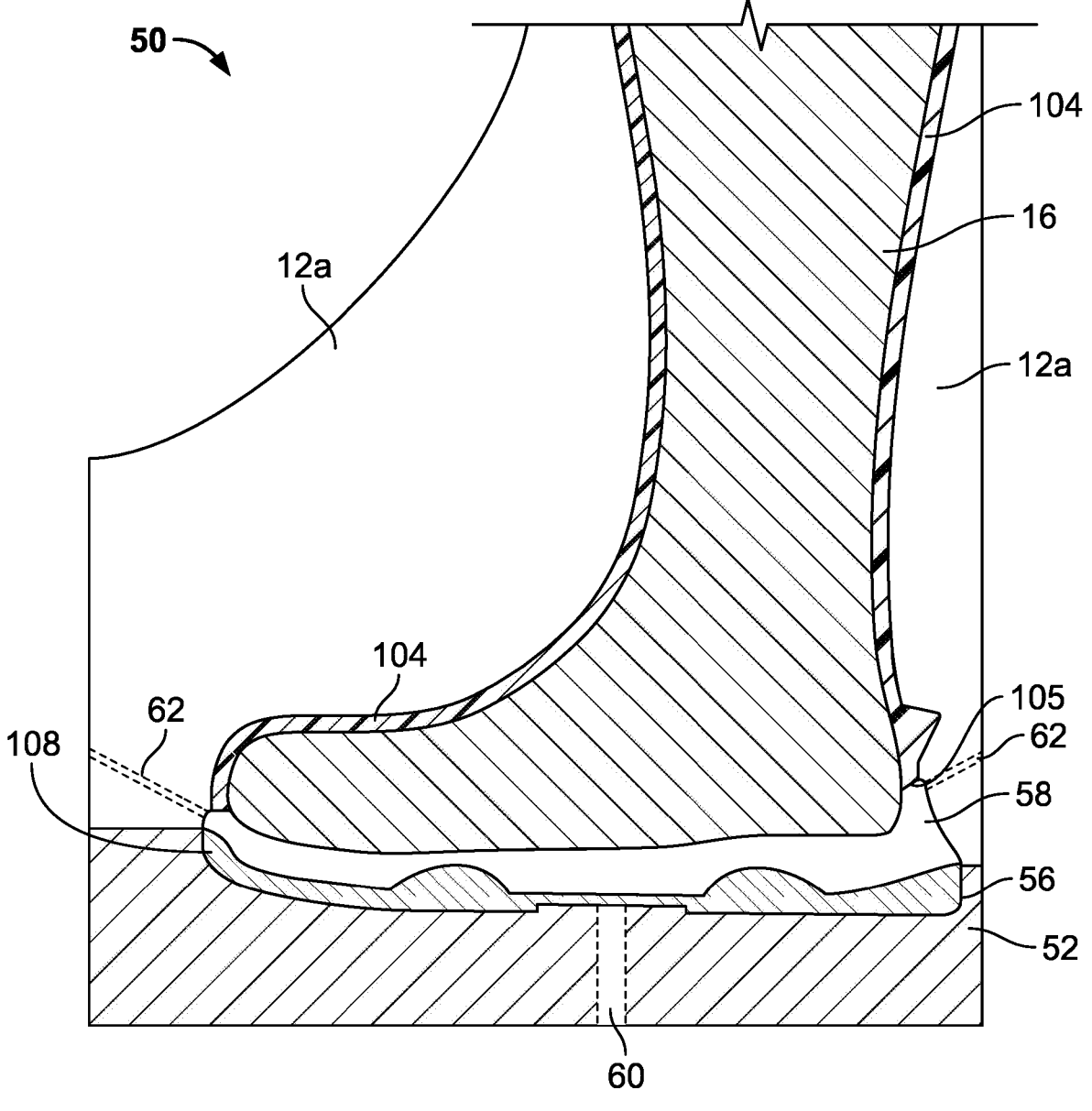
FIG. 8 is a cross-sectional view of the second mold of FIG. 6 in a closed position.

Turning now to second mold 50 in FIGS. 6-8, second mold 50 is composed of shell 12, last 16 and a second plate 52. Second plate 52 is shown from the side in FIG. 6. It has a top surface 54 for mating with bottom surface 36. Top surface 54 is preferably the same as top surface 34 of first plate 14. Second plate 52 has a recessed portion 56 (shown in FIG. 7) below top surface 54 corresponding generally to an outsole 108. The bottom of recessed portion 56 preferably matches outsole 108 of sole 106, particularly the tread pattern, which typically includes large, spaced lugs, and for purposes of molding outsole 108 separately from molds 10 and 50 or holding a separately made outsole 108, particularly if outsole 108 is made of a different material than midsole 110. As shown in FIG. 8, recessed portion 56 contains outsole 108. FIG. 8 omits the details of the bottom of recessed portion 56 and FIG. 9 omits the details of the tread pattern.

Second mold 50, as shown in a closed position in FIG. 8, includes upper 104 that was injection molded in first void 28 and sock liner 102 (not illustrated) over last 16. Second mold 50 in conjunction with upper 104, defines a second void 58 for a sole 106 or a portion of a sole 106 to be injection molded within shell 12, which does not include the recessed portion 56 in second plate 52. Second void 58 is connected to at least one second void sprue 60, but preferably one, and at least one second void air passage 62. Preferably, sprue 60 is located at or near a horizontal center of sole 106, in last 16 or preferably second plate 52. Second void air passages 62 are preferably located in a toe area of shell 12 corresponding to toe 112 of boot 100 and in a heel area of shell 12 corresponding to heel 114 of boot 100. Sprue 60 and second void air passages are shown in dashed lines because they may not be located along the cross-section line shown in FIG. 1. Indeed, it is preferred that shell half 12a and shell half 12b both have a second void air passage 62 in the toe area and a second void air passage 62 in the heel area. As can be seen in FIG. 5, second void air passages 62 in shell 12 are not connected to first void 28 in mold 10 because they are covered by raised portion 22 of first plate 14. As can be seen in FIG. 7, absent upper 104, second void air passages 62 communicate with first void 28 via second void 58, but are not directly connected to first void 28.

Figure 9:
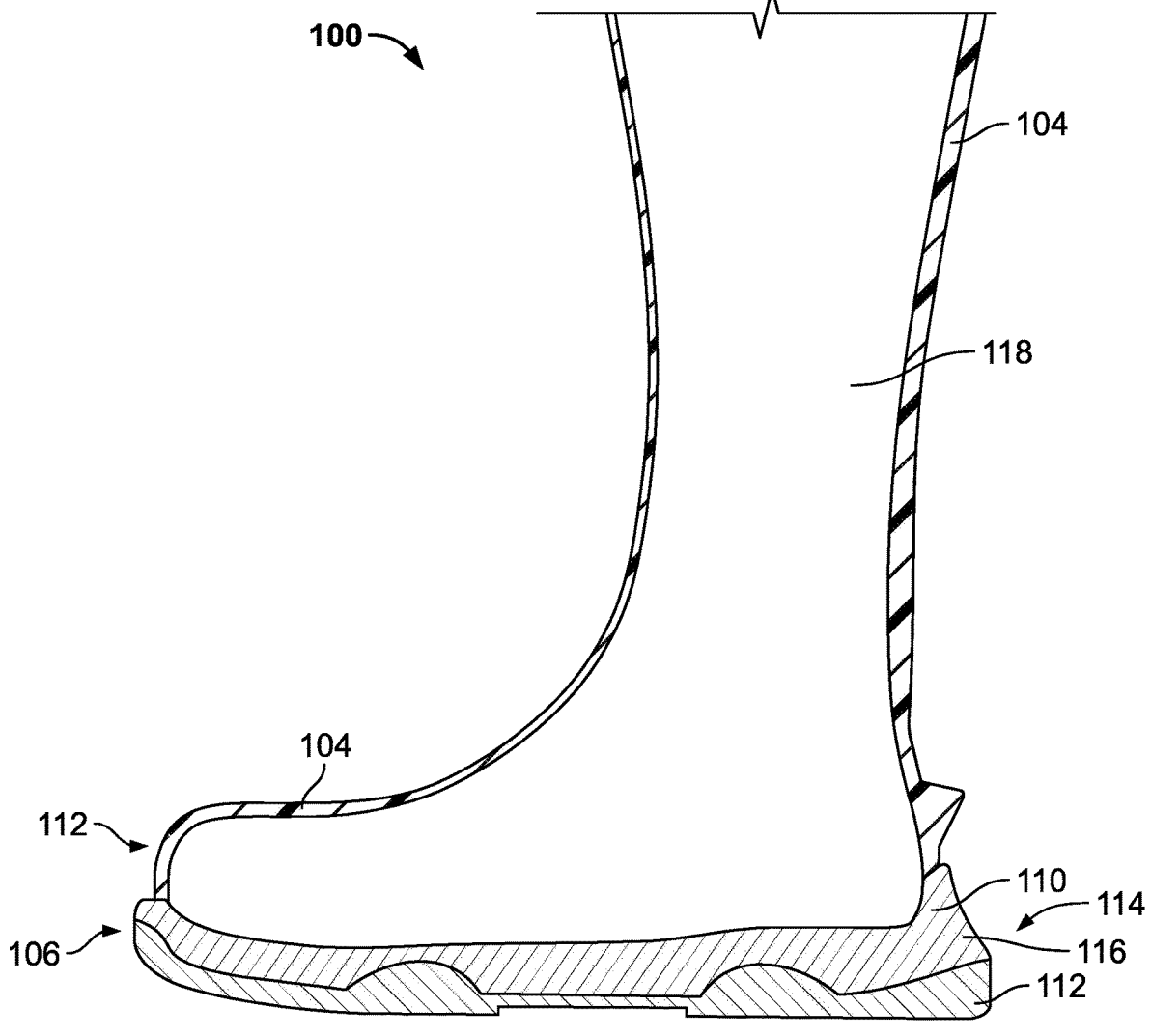
FIG. 9 is a cross-sectional view of a boot made with the molds of FIG. 1.

As shown in FIG. 8, second void 58 extends rearwardly of upper 104 particularly boundary 105, first void 28 and last 16 such that heel portion of sole 106 (as shown in FIG. 9) also extends rearwardly of the inside of boot 100 and upper 104. Additionally, second void 58 extends rearwardly and diagonally such that heel 114 flares out in midsole 110 further down the midsole you go. Flare 116 of heel 114 is not possible in the conventional way of injection molding rubber boots because flare 116 would be within the plate which moves downwardly when the mold opens and would pull down on the heel. In contrast, with molds 10 and 50, flare 116 is contained in shell 12 which separates into shell half 12a and shell half 12b, which move right and left when mold 50 opens. Flare is used here in its conventional sense of becoming wider or spreading outwardly as in flared pant legs, but not in a big step. Heel 114 extends rearward of the lower boundary 105 of upper 104 by more than 0.1 inches, preferably more than 0.2 inches, still more preferably 0.3 inches, and most preferably at least 0.4 inches. Heel 114 can extend rearwardly between 0.5-0.6 inches in an adult size 9. Molds 10 and 50 would also be particularly useful for making soles 106 that flare outwardly in the front or sides.

FIG. 9 illustrates finished boot 100. Boot 100 has an upper 104, a sole 106 and a cavity 118 for a wearer's foot and leg. Sole 106 includes an outsole 108, midsole 110 and optionally a removable insole (not shown) that is typically placed manually into the bottom of cavity 118. Cavity 118 is lined with sock liner 102 (illustrated in FIGS. 5 and 5A). Boot 100 has a heel 114 and a toe 112. Boot 100 may have a steel toe. Outsole 108 is preferably non-slip and has large, angular, spaced lugs for evacuating debris from the outsole. Preferably, the outsole is made of vulcanized rubber. Any suitable material may be used for the sock liner, the upper, the midsole. The sock liner may be made from any suitable woven or a non-woven textile, such as ones made from nylon. The upper and midsole may be made from any suitable thermoplastic elastomer including Styrene-Ethylene-Butylene-Styrene.

In another aspect of the invention, a method of making footwear having an upper and a sole by injection molding is provided. The method includes providing a first mold having a shell, a first plate and a last and covering the last with a sock liner of the footwear to be made. If desired, a steel toe is placed in the first mold. Next, the first mold is closed and the upper of the footwear is injection molded in the shell of the first mold by injecting a resin or molten polymer into the first void in the first mold. Next, the first plate is removed from the first mold and an outsole is placed in a second plate. A second mold having the shell containing the upper, the second plate having the outsole and the last is closed. At least a portion of the sole is injection molded in the shell and onto the upper by injecting a resin or molten polymer, i.e., midsole material, into a second void in the second mold. The portion, preferably the heel of the midsole, flares outwardly, e.g., sideways or rearwardly, of where the upper and the portion of the sole are in contact. Preferably, the entire midsole is injection molded along with the portion, but it is not necessary for the entire midsole to flare out. Next the second mold is opened and the injection molded footwear is removed from the last. Optionally, an insole is inserted into the molded footwear. Preferably, the method uses molds 10 and 50 previously described as the first and second molds.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

6

What is claimed is:

1. A method of making footwear having an upper and a sole by injection molding, the method comprising:
  closing a first mold having a shell, a first plate and a last;
  injection molding the upper in the first mold;
  closing a second mold having the shell, a second plate and the last; and
  injection molding at least a portion of the sole in the shell in the second mold, the portion of the sole flaring outwardly of where the upper and the portion of the sole are in contact.

2. The method of claim 1 further comprising:
  covering the last with a sock liner of the footwear before injection molding the upper;
  opening the second mold; and
  removing the footwear from the second mold.

3. The method of claim 2 further comprising inserting an insole into the molded footwear.

4. The method of claim 1 further comprising inserting a steel toe into the first mold.

5. The method of claim 1 wherein injection molding at least a portion of the sole comprises injection molding at least a portion of the sole onto the upper.

6. The method of claim 1 wherein the first plate extends into the shell to provide a lower boundary to the upper.

7. The method of claim 1 wherein injection molding at least a portion of the sole comprises pushing air with midsole material out of the mold through a passage in the shell.

8. The method of claim 7 wherein the first plate extends into the shell to provide a lower boundary to the upper and covers the passage when the first mold is closed.

* * * * *